US009448617B2

(12) United States Patent
Brown et al.

(10) Patent No.: US 9,448,617 B2
(45) Date of Patent: Sep. 20, 2016

(54) SYSTEMS AND METHODS FOR MESSAGING-BASED FINE GRANULARITY SYSTEM-ON-A-CHIP POWER GATING

(71) Applicant: FutureWei Technologies, Inc., Plano, TX (US)

(72) Inventors: Mark Brown, Rochester, MN (US); Mehran Bagheri, Lake Forest, IL (US); Peter Yan, Plano, TX (US); Alan Gatherer, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 201 days.

(21) Appl. No.: 14/204,555

(22) Filed: Mar. 11, 2014

(65) Prior Publication Data
US 2015/0261290 A1    Sep. 17, 2015

(51) Int. Cl.
*G06F 1/32* (2006.01)
*G06F 13/40* (2006.01)
*G06F 9/44* (2006.01)

(52) U.S. Cl.
CPC ........... *G06F 1/3293* (2013.01); *G06F 1/3243* (2013.01); *G06F 9/4418* (2013.01); *G06F 13/4022* (2013.01); *Y02B 60/1235* (2013.01); *Y02B 60/1239* (2013.01); *Y02B 60/32* (2013.01)

(58) Field of Classification Search
CPC ............................. G06F 1/3293; G06F 9/4418
See application file for complete search history.

(56) References Cited

U.S. PATENT DOCUMENTS 5,620,202 A * 4/1997 Gray .................. B60R 21/01
280/730.2
5,946,375 A * 8/1999 Pattison ................. G07C 1/10
379/111
6,058,163 A * 5/2000 Pattison ................. G07C 1/10
379/133
2009/0186595 A1    7/2009 Son et al.
(Continued)

FOREIGN PATENT DOCUMENTS

CN    103229469 A    7/2013
WO    2011090293 A2    7/2011

OTHER PUBLICATIONS

Chin, C., "Big Rocks First," Synopsis retrieved from http://semiengineering.com/big-rocks-first/, Aug. 31, 2015, 5 pages.
(Continued)

*Primary Examiner* — Thomas Lee
*Assistant Examiner* — Mohammad A Rahman
(74) *Attorney, Agent, or Firm* — Slater Matsil, LLP

(57) ABSTRACT

System and method embodiments are provided for messaging-based System-on-a-chip (SoC) power gating. The embodiments enable fine granularity SoC power gating without introducing significant latency and substantially maximizes SoC power reduction. In an embodiment, a method in a first SoC resource for messaging-based power gating includes receiving at the first SoC resource a wakeup notification message (WNM) from a second SoC resource, wherein the WNM comprises a time at which a result message from the second SoC resource is expected to arrive at the first SoC resource; determining with the first SoC resource a wake-up time according to the time at which the result message from the second SoC resource is expected to arrive at the first SoC resource; setting a wake-up time timer to expire at the wake-up time; and waking up the first SoC resource when the wake-up time timer expires when the first SoC resource is asleep.

20 Claims, 4 Drawing Sheets

(56) References Cited

U.S. PATENT DOCUMENTS

| | | | |
|---|---|---|---|
| 2010/0100716 A1* | 4/2010 | Scott | G06F 1/3209 |
| | | | 713/1 |
| 2012/0297216 A1* | 11/2012 | Olszewski | G06F 1/3206 |
| | | | 713/320 |
| 2013/0223313 A1 | 8/2013 | Aboul-Magd et al. | |
| 2013/0238922 A1* | 9/2013 | Ling | G06F 1/3209 |
| | | | 713/323 |
| 2014/0095739 A1* | 4/2014 | Kobayashi | G06F 13/24 |
| | | | 710/14 |

OTHER PUBLICATIONS

International Search Report and Written Opinion of the International Searching Authority received in Patent Cooperation Treaty Application No. PCT/CN2015/073963 mailed May 29, 2015, 12 pages.

Jeong, K. et al., "MAPG: Memory Access Power Gating," Design, Automation & Test in Europe Conference & Exhibition (Date), Mar. 12-16, 2012, 6 pages.

* cited by examiner

SYSTEMS AND METHODS FOR MESSAGING-BASED FINE GRANULARITY SYSTEM-ON-A-CHIP POWER GATING

TECHNICAL FIELD

The present invention relates to a system and method for managing system on a chip (SoC) power gating, and, in particular embodiments, to messaging-based SoC power gating with fine granularity.

BACKGROUND

A system on a chip (SoC) is an integrated circuit (IC) that integrates many key components of a computer or other electronic system into a single chip. The SoC may contain digital, analog, mixed-signal, and/or radio-frequency functions on a single chip substrate. Reducing the overall power consumption of a system on a chip (SoC) is a major goal of low power design. There are various techniques for achieving this goal, such as, for example, gating of complete sections of a SoC. One major issue with power gating is deciding when various sections of a SoC can be power gated without compromising the operational performance of the system. This is especially true for real-time systems that have explicit latency constraints that must be met. The SoC architecture usually includes a set of computational/storage resources that communicate with each other using message passing through a Network-on-a-Chip (NoC) or Advanced Extensible Interface (AXI) interconnect. The communication between these resources consists of messages that contain operational instructions and/or data.

SUMMARY

In accordance with an embodiment, a method in a first system on a chip (SoC) resource for messaging-based power gating includes receiving at the first SoC resource a wakeup notification message (WNM) from a second SoC resource, wherein the WNM comprises a time at which a result message from the second SoC resource is expected to arrive at the first SoC resource; determining with the first SoC resource a wake-up time according to the time at which the result message from the second SoC resource is expected to arrive at the first SoC resource; setting a wake-up time timer to expire at the wake-up time; and waking up the first SoC resource when the wake-up time timer expires when the first SoC resource is asleep, wherein waking up the first SoC resource comprises waking up at least one sub-resource in the first SoC resource.

In accordance with an embodiment, a system on a chip (SoC) resource includes an input/output (I/O) interface connected to an interconnect and configured to receive a wakeup notification message (WNM) from a second SoC resource via an interconnect, wherein the WNM comprises a time at which a result message from the second SoC resource is expected to arrive at the SoC resource; and a power management controller coupled to the I/O interface and configured to determine a wake-up time according to the time at which the result message from the second SoC resource is expected to arrive at the SoC resource, set a wake-up time timer to expire at the wake-up time, and wake up the SoC resource when the wake-up time timer expires when the SoC resource is asleep.

In accordance with an embodiment, a data processing system includes a plurality of system on a chip (SoC) resources configured for messaging based communication with each other; and a network bus connected to each of the plurality of SoC resources, wherein each of the SoC resources comprises: an input/output (I/O) interface connected to the network bus; at least one resource processing sub-component or resource storage sub-component connected to the I/O interface; a power management controller connected to the I/O interface; at least one power switch connected to the power management controller, connected to a power supply, and connected to at least one resource processing sub-component or resource storage sub-component connected to the I/O interface; and a wake-up time timer connected to the power management controller, wherein the I/O interface is configured to receive a wakeup notification message (WNM) from another one of the SoC resources, wherein the WNM comprises a time at which a result message from the another one of the SoC resource is expected to arrive at the SoC resource, and wherein the power management controller is configured to determine a wake-up time according to the time at which the result message from another one of the SoC resources is expected to arrive at the SoC resource, set the wake-up time timer to expire at the wake-up time, and wake up at least one of the resource processing sub-components or resource storage sub-components when the wake-up time timer expires when the at least one of the resource processing sub-components or resource storage sub-components is asleep.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
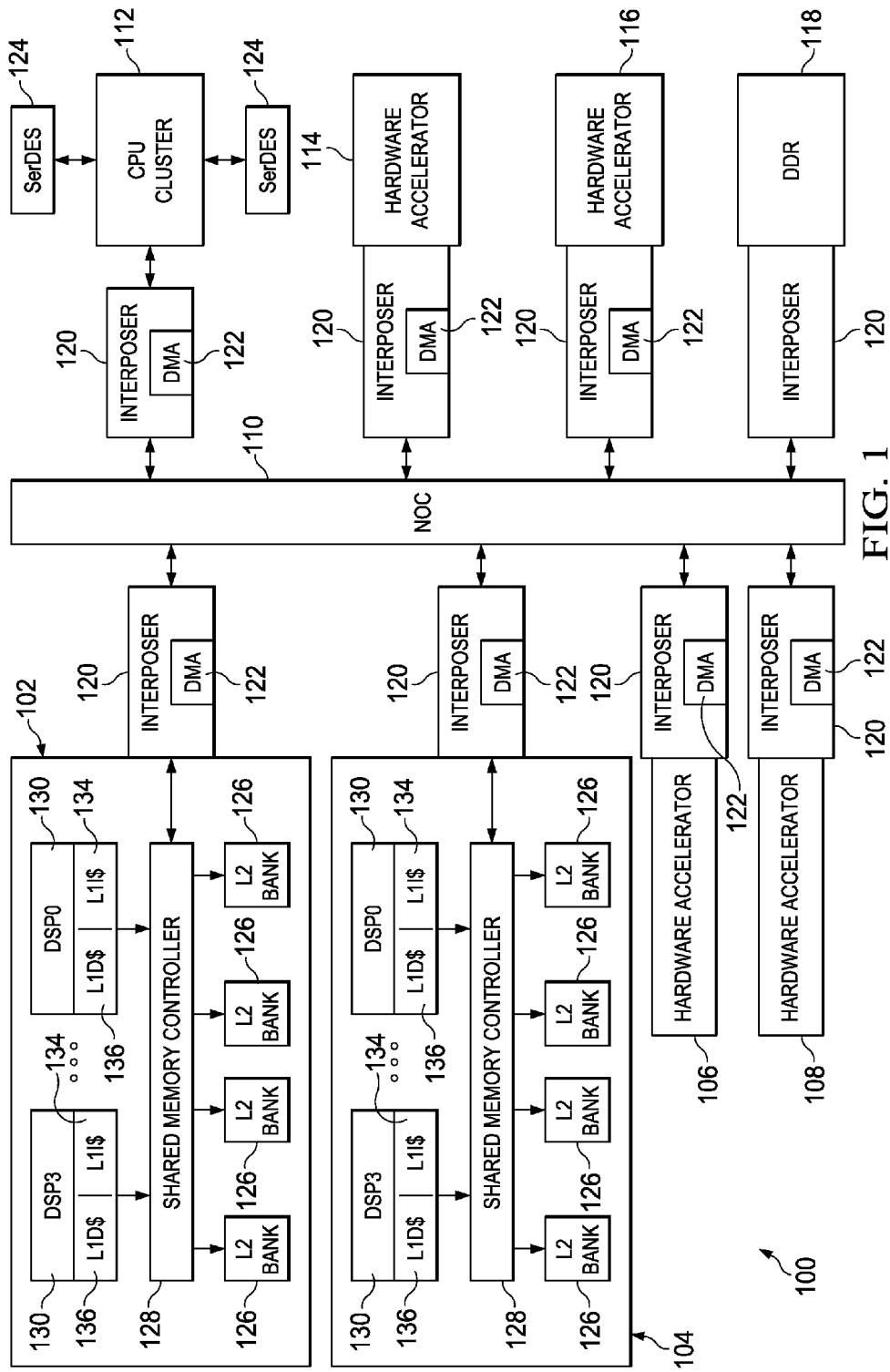
FIG. 1 illustrates an embodiment SoC architecture for messaging-based fine granularity SoC power gating.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems, methods, and apparatuses for a low-power controller that optimizes the periods of time when a computing/storage resource in a SoC can be power gated, thereby reducing the overall SoC power consumption. In an embodiment, the systems, methods, and apparatuses are common to all categories of computational/storage resources that appear in a data-flow message based system. One advantage of the disclosed systems, methods, and apparatuses is real-time fine-grain control of power gating to insure the maximum resource power gating time, yielding the lowest power consumption within a SoC at any given point in time without adding extra latency to the processing of real time applications.

In an embodiment, one objective of a fine-granularity, power-gating scheme is to coordinate its use with the time that an operational/storage resource needs to be awake to perform operations. In an embodiment, the system architecture is a collection of independent resources that process data from messages and send new message to other resources (dataflow). Examples of a system resource include a central processing unit (CPU), a digital signal processor (DSP), a hardware accelerator cluster (HAC), and a memory subsystem. In an embodiment, in order to perform the coordination, operational periods and idle periods for each resource are defined. In an embodiment, an operational period of a resource is defined as any time when the resource is not idle. In an embodiment, idle periods are defined dependent upon resource category where the idle period for some categories of resources (e.g., CPUs, DSPs) is defined as the time when no program threads are running and none are scheduled to run (this may be controlled by the resident Real-time Operating System (RTOS)) and other categories the idle period for other resources (e.g., HACs) is defined as a time when no operations are being performed. In other embodiments, there may be additional resource categories and the definition of idle periods may be different in different embodiments.

Embodiments of the disclosure enable a fine-granularity common power-gating process algorithm for all types of resources in a message-passing system that allows the computational resources to be power gated for small (e.g., tens of cycles) periods of inactivity. In contrast, traditional techniques include a coarse power gating technique that requires large periods of time for the computational resource to be inactive. Furthermore, embodiments of the disclosure also provide a technique for maximizing sleep periods when a resource is idle, thus increasing power savings. Additionally, embodiments of the disclosure eliminate wake-up stalls, i.e., an operation that needs to run but must wait for the resource to wake-up, since such latencies cannot be tolerated in systems processing real-time applications.

FIG. 1 illustrates an embodiment SoC architecture 100 for messaging-based fine granularity SoC power gating. The SoC architecture 100 includes a Network on a Chip (NoC) connecting a plurality of resources. The NoC 110 may include a network bus. The resources include a plurality of DSPs 102, 104, a plurality of hardware accelerators (HACs) 106, 108, 114, 116, a CPU cluster 112, and a Double Data Rate (DDR) memory subsystem 118. Each of the resources 102, 104, 106, 108, 112, 114, 116, 118 is connected to the NoC 110 via an interposer 120 that provides appropriate facilities for message based communication with other resources 102, 104, 106, 108, 112, 114, 116, 118. Some of the interposers 120 include a Direct Memory Access (DMA) component 122. In other embodiments, the SoC architecture 100 may include additional or different components and resources to those shown in FIG. 1.

Each DSP cluster 102, 104 includes a shared memory controller (SMC) 128, a plurality of shared level 2 (L2) memory caches (L2 bank) 126, and a set of DSP subsystems 130 (4 DSPs, DSP0-DSP3, are shown as an example). The L2 banks 126 are shared between the DSP processing subsystems 130. The DSP processing subsystems 130 each include a level 1 (L1) data cache (L1 D$) 136 and a L1 instruction cache (L1 I$) 134.

The HACs 106, 108, 114, 116 are used to perform some functions faster than is possible in software running on a general purpose CPU, such as, for example, CPU cluster 112. HACs 106, 108, 114, 116 are designed for computationally intensive software code. An example of a HAC is a graphics accelerator. The HACs 106, 108, 114, 116 may be any type of electronic processor. The CPU cluster 112 may include one or more processors which may be any type of electronic processors. The CPU cluster 112 also include a plurality of serial/deserializers (SerDESs) 124 to convert data between serial data and parallel interfaces in each direction and often used to compensate for limited input/output. The DDR memory subsystem 118 may include any type of system memory such as static random access memory (SRAM), dynamic random access memory (DRAM), synchronous DRAM (SDRAM), read-only memory (ROM), a combination thereof, or the like. In an embodiment, the DDR memory subsystem 118 may include ROM for use at boot-up, and DRAM for program and data storage for use while executing programs.

SoC 100 is configured to provide message-based SoC power gating. The resources 102, 104, 106, 108, 112, 114, 116, 118 are independent resources that process data from messages and send new messages to other resources 102, 104, 106, 108, 112, 114, 116, 118. SoC 100 is configured to coordinate a power-gating scheme with the time that an operational/storage resource needs to be awake in order to perform its operations without additional latency. In an embodiment, to perform the coordination, operational periods of a resource are defined as any time when the resource is not idle (i.e., not in an idle state) and idle periods (or idle state periods) for a resource are defined as follows dependent on resource category:

| Resource Category | Idle Period |
| --- | --- |
| CPUs, DSPs | Time when no program threads are running and none are scheduled to run. This is controlled by the resident Real-time Operating System (RTOS). |
| HACs | Time when no operations are being performed. |

To understand the disclosed power gating scheme, consider the following simple example where resource R1 performs an operation, sends a data message (DM) to resource R2, and then R2 performs an operation based on that message (DM). Further, assume that resource R2 is idle while resource R1 performs its operation. Thus, the goal is for resource R2 to power gate itself while R1 performs its operation and for R2 to wake up from a power gated state before it receives the DM from R1. Given that R2 is idle while R1 performs an operation, a controller in R2 manages the power gating. R2 receives a wake-up notification message (WNM) from R1 as to what time in the future R2 will need to perform an operation. Given these performance parameters, the power management controller for each resource behaves as follows:

When WNM received:
  Maintain a wake-up time queue that keeps track of all future times the device will need to wake-up (i.e., future wake-up times). Set the timer to expire for the soonest wake-up time.
When the wake-up timer fires:
  If the resource is asleep (i.e., in a sleep state, low power state, lower power state, or no power state), then wake it up.
  Set the timer to expire on the next earliest wake-up time scheduled in the wake up time queue if one exists.
When the resource's idle signal changes (idle <-> active):
  If the resource becomes idle and if the time between now and the current wake-up time is greater than the resource break-even time (i.e., the minimum time needed by a resource to be kept in a powered down state to cover the cost of powering it up, plus (optionally) an error guardband) or no wake-up time is scheduled, put the resource to sleep.

The time values contained within the WNMs measure an optimistic completion time of an operation under various input conditions. These times are obtained, for example, from a characterization of the performance of an operation under various input conditions. For example, a DSP can be characterized as to how many cycles a DSP algorithm takes to process. There are at least two possible locations within an operation where a WNM can be sent. In a first embodiment, the wake-up message is sent right after R1 completes its operation, but before it sends the DM to be processed by R2. However, for this to work, the time for R1 to send the DM to R2 should be greater than the WNM transmit time and the wake-up latency time for resource R2, which is power gated. Also, this difference should be greater than the break even time. Alternatively, in a second embodiment, the WNM is sent at some earlier time during the R1 operational period. In one embodiment, the WNM is sent at the start of the operation in R1 to ensure that resource R2 can be put to sleep at the earliest time possible for maximum power savings and to awaken in time to perform its operation without latency.

Figure 2:
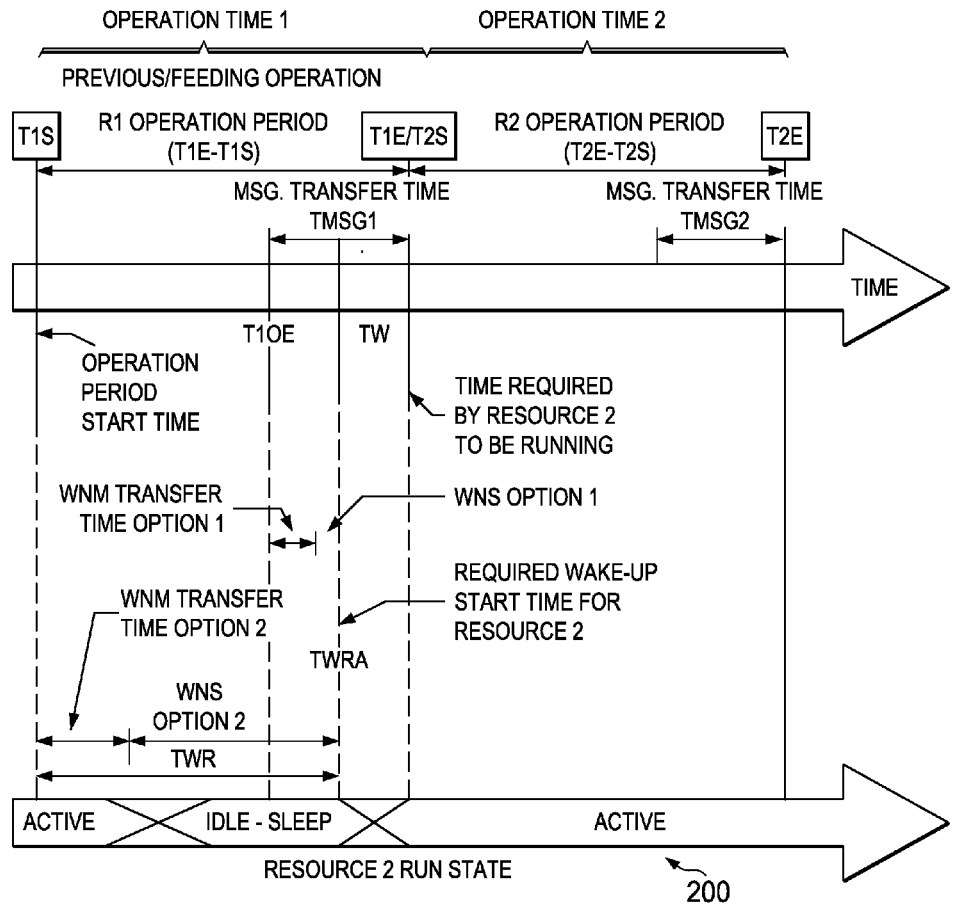
FIG. 2 illustrates an abstract timing diagram for an embodiment message-based power gating method.

FIG. 2 illustrates an abstract timing diagram for an embodiment message-based power gating method 200. The operation periods of a resource are first defined by the required absolute start time (T2S) for the operation. The absolute start time (T2S) is determined by the reception of one or more messages by a resource signaling the completion of a pervious operation (T1E). At this time, in an embodiment, the resource is required to be fully functional. The absolute end time (T2E) of an operation period is the time within which a resource completes the requested operation plus the time needed to send a result completion message to a subsequent resource (TMSG2). The absolute time at which a powered-down resource is required to wake up (TWRA) is defined as the time an operation needs to start (T2S) minus the time required by the resource to transition from sleep mode to active mode (TW). Since the end time of a previous or feeder operation (T1E) is the same as the start time of the fed operation (T2S), the required wake-up time (TWR) relative to the start of the previous or feeder operation (T1S) can be calculated as the operation period of that previous or feeding operation (T1E−T1S) minus the time required to transition the fed resource from sleep mode to active mode (TW). That is: TWR=T1E−T1S−TW (again relative to T1S). Therefore, if a notification of wake-up time is sent from a feeding operation, it can be assured that the resource will be functional at the appropriate time (T2S). This allows the resource to be kept in a "powered down" state for the longest possible time.

There are two places within the resource operation period from which the "wake-up" notification can be sent. The first is at the end of the feeder operation before it sends the result message to the resource (T1OE). This requires that the maximum resource wake-up time (TW) must be no more than the difference between the result message transfer time (TMSG1) and the wake-up notification transfer time (option 1 TWN) defined as the wake-up notification slack time (option 1 WNS). If this requirement is not met, the resource will not be active in time to process the operation message causing a wake-up stall.

The second place to send the wake-up notification message (WNM) is at the start of the feeder operation (T1S). This will provide the necessary time for the notification message transfer as the expected minimum operation times are greater than this transfer time (option 2 TWN). Hence, a much larger wake-up slack time (option 2 WNS) is available. A larger wake-up slack time enables waking up of power gated resources in a timely manner without introducing any latency at the same time also maximizing the power gated time.

Figure 3:
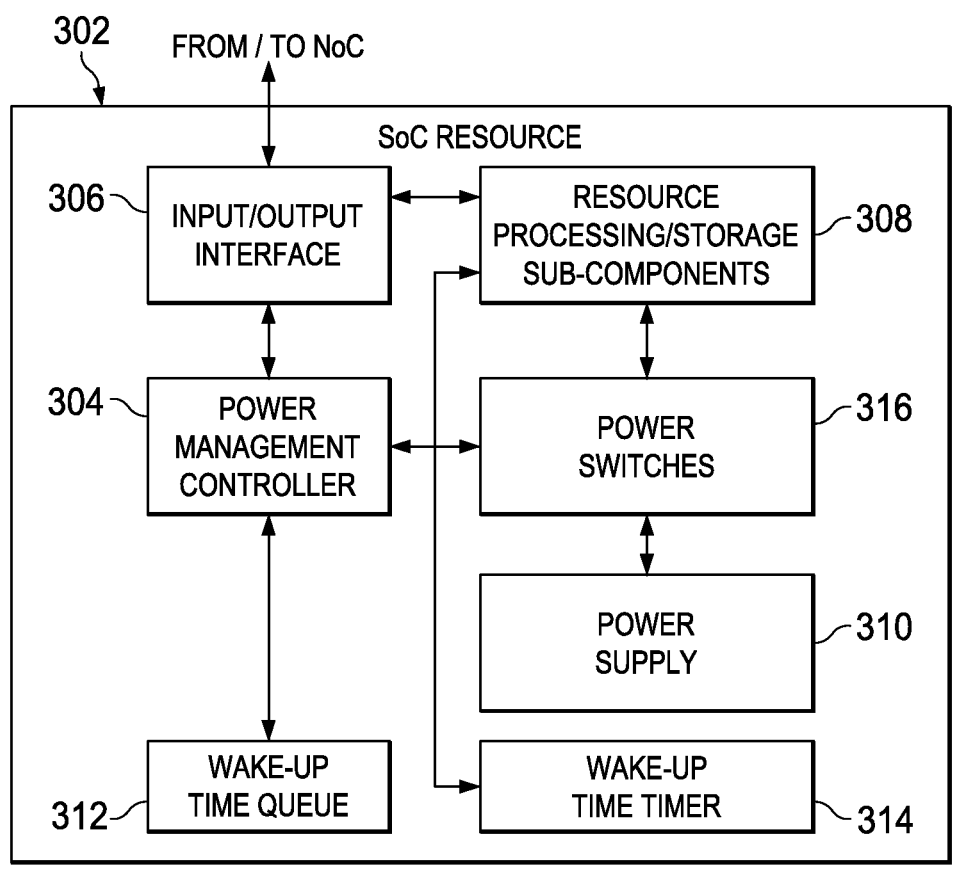
FIG. 3 illustrates an embodiment SoC resource with power management controller.

FIG. 3 illustrates an embodiment SoC resource 300 with power management controller. SoC resource 302 may be implemented as, for example, any of resources 102, 104, 106, 108, 112, 114, 116, 118 depicted in FIG. 1 and may be configured to implement method 200 shown in FIG. 2. SoC resource 300 includes an input/output (I/O) interface 306, a power management controller 304, resource processing/storage sub-components 308, a power supply 310, power supply switch(es) 316, a wake-up time queue 312, and a wake-up time timer 314. The I/O interface 306 is configured to receive WNMs from other resources via the NoC. In other embodiments, other types of interconnect networks are utilized other than NoC. The WNM indicates a time at which the SoC resource 302 is expected to receive a result message on which the SoC resource 302 must perform some operation without any delay. The I/O interface 306 is also configured to receive result messages from other SoC resources via the NoC. WNMs received by the I/O interface 306 are provided to the power management controller 304 which uses the WNMs to determine whether to power down the resource processing/storage sub-components 308 and when to awaken powered-down resource processing/storage sub-components 308 to be ready to perform an operation when a result message is received from another SoC resource. The power management controller 304 is coupled to the power supply 310 using power switch(es) 316 to power down or power up the resource processing/storage sub-components 308. In an embodiment, the power management controller 304 may control the power switch(es) 316 such that only some of the resource processing/storage sub-components 308 are powered down or up while others remain in an opposite state. Thus, at any given time, some of the resource processing/storage sub-components 308 may be awake and some may be asleep to conserve power. The resource processing/storage sub-components may include processors, DSPs, memory units, storage devices, HAC sub-components, or any other component that may be implemented in a SoC. The power management controller 304 is configured to implement method 200 and may include a processor and memory component. The definition of idle time during which the resource processing/storage sub-components 308 may be powered down may vary depending on the type of SoC resource 302 in which the power management controller 304 is implemented.

The power management controller 304 maintains a wake-up time queue that keeps track of all future times the SoC resource 302 will need to wake-up and maintains a wake-up timer. The power management controller 304 calculates a wake-up time for each WNM it receives. The wake-up time is calculated such that the SoC resource 302 is provided with enough time to power up and be ready to perform the requested operation at the time the result message is received by the SoC resource 302. Thus, for example, if a WNM specifies that a result message will arrive at the SoC resource 302 at a time $T_a$ and it takes the SoC resource 302 time $T_b$ to be powered up and ready to operate without latency, then the power management controller 304 determines a wake-up time $T_w$ to be $T_w=T_a-T_b$. That is, the wake-up time, $T_w$, is set a time period $T_b$ earlier than the $T_a$ (plus possibly some margin) such that at time $T_a$, the SoC resource 302 is ready to perform the requested operation on the result message. The power management controller 304 sets the wake-up time timer 314 to expire for the soonest wake-up time in the wake-up time queue 312 based on expected arrival of all messages. When the wake-up time timer 314 expires, the power management controller 304 wakes up the SoC resource 302 (i.e., signals the power supply 310 to provide power to the resource processing/storage sub-components 308 by turning on the power switch(es) 316) if the SoC resource 302 is asleep and sets the wake-up time timer 314 to expire on the next earliest wake-up time scheduled in the wake-up time queue 312 if one exists.

The power management controller 304 also calculates the time at which messages sent by the SoC resource 302 to another SoC resource will arrive at the other SoC resource and transmits a WNM to the other SoC resource that indicates the time that the other resource will receive a result message from the SoC resource 302 after completion of the operation by the SoC resource 302 and may also indicate the type of operation that the other SoC resource is expected to perform. The power management controller 304 determines the type of operation that the SoC resource 302 will be performing and the amount of time that that type of operation is expected to take on the SoC resource and the amount of time that the result message will take to arrive at the other SoC resource after being transmitted by the SoC resource 302. Once the time that the result message is expected to arrive at the other resource is calculated, the power management controller transmits a WNM through I/O interface 306 to the other SoC resource.

When the SoC resource's (or one of the resource processing/storage sub-components 308) state changes from active to idle, the power management controller 304 determines whether the time between the current time and the next wake-up time (i.e., time duration between the current time and the next wake-up time) is greater than the resource break-even time and, if so, or if no wake-up time is scheduled, puts the resource to sleep. The resource break-even time is the minimum time needed by a resource to be kept in a powered down state to cover the cost of powering it up plus, optionally, an error guardband time period.

In an embodiment, there are multiple sleep modes for a resource (e.g., the resource processing/storage sub-components 308). For example, in an embodiment, a resource or sub-component has three sleep states—1) a light sleep mode, 2) a deep sleep mode, and 3) a shut down mode. The power management controller 304 is connected directly to the resource processing/storage sub-components 308 to put one or more of the resource processing/storage sub-components 308 into a light sleep or a deep sleep mode. The light sleep mode and the deep sleep mode may be modes supported directly by the resource processing/storage sub-components 308 themselves. To put one or more of the resource processing/storage sub-components 308 into a shut down mode, the power management controller 304 may instruct one or more of the power switches connected to one or more of the appropriate resource processing/storage sub-components 308 to completely shut down power to those particular resource processing/storage sub-components 308. Different sleep modes may have different benefits in terms of power savings and have different costs in terms of their wake up time. For example, in an embodiment, the shut down mode provides the largest power savings, but at the cost of the largest wake up time. In an embodiment, the light sleep mode provides the least power savings of the three modes, but also has the shortest wake up time. The deep sleep mode provides a greater power savings than the light sleep mode, but with a longer wake up time. However, the deep sleep mode has a shorter wake up time than the shut down mode, but provides less power savings. The particular mode chosen by the power management controller 304 may be selected based on substantially optimizing the power savings while still allowing the resource or sub-resource to wake up in time to perform a requested function without latency or having storage components maintain their contents.

Figure 4:
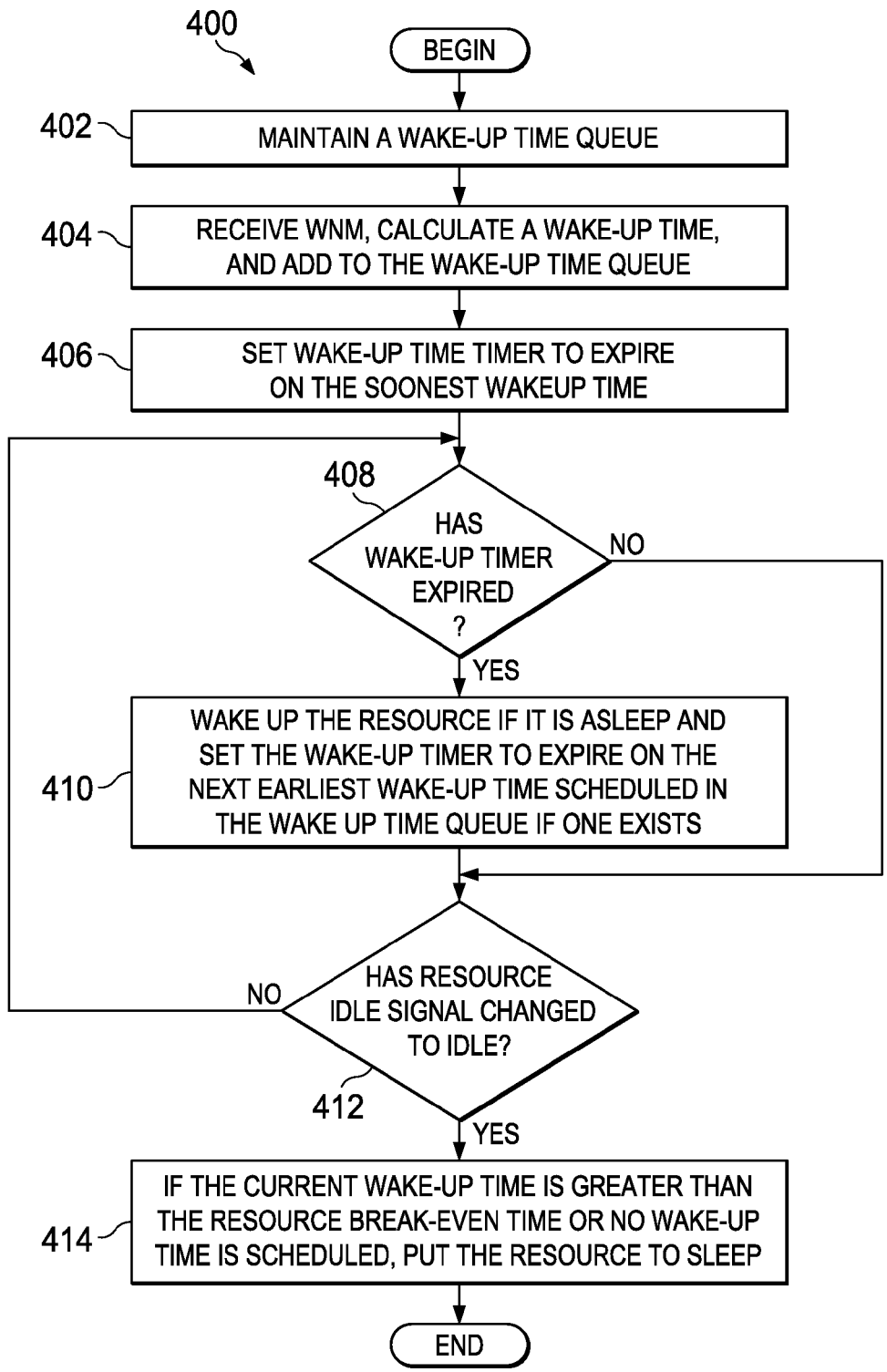
FIG. 4 shows a flowchart illustrating an exemplary method for messaging-based SoC power gating.

FIG. 4 shows a flowchart illustrating an exemplary method 400 for messaging-based SoC power gating. Method 400 may be implemented by power management controller 304 in FIG. 3. Method 400 begins at block 402 where a wake-up time queue is maintained. At block 404, a WNM is received, a wake-up time for the WNM is calculated, and the wake-up time is added to the wake-up time queue. At block 406, the wake-up timer is set to expire on the soonest wake-up time in the wake-up queue. At block 408, the power management controller determines whether the wake-up timer has expired. If, at block 408, the wake-up timer has expired, then the method 400 proceeds to block 410 where the power management controller wakes up the resource if it is asleep and sets the wake-up timer to expire on the next earliest wake-up time scheduled in the wake-up time queue if one exists. If the wake-up timer has not expired in block 408 or after setting the wake-up time timer to expire on the next earliest wake-up time in block 410, the method 400 proceeds to block 412 where the power management controller determines whether the resource idle signal has changed to idle. If, at block 412, the resource is not idle, the method 400 proceeds to block 408 (or to block 404). If, at block 412, the resource idle signal indicates that the resource is idle, the method 400 proceeds to block 414 where the power management controller puts the resource to sleep if there is no wake-up time in the wake-up time queue or if the current wake-up time in the wake-up time timer is greater than the resource break-even time, after which, the method 400 ends (or returns to block 404).

Although described primarily with reference to electrical systems and NoCs, the systems, methods, and devices may also be applied to other systems such as, for example, cross-connect (or cross-bar interconnect) types of interconnects (instead of NoCs), optical network on a chip (ONoC) with optical resources, and to optical/electrical hybrid devices and systems.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a first system on a chip (SoC) resource for messaging-based power gating, the method comprising:
    receiving at the first SoC resource a wakeup notification message (WNM) from a second SoC resource, wherein the WNM comprises a time at which a result message from the second SoC resource is expected to arrive at the first SoC resource, and wherein the second SoC resource sends the WNM at or before the start of a feeder operation in the second SoC resource;

determining with the first SoC resource a wake-up time according to the time at which-the result message from the second SoC resource is expected to arrive at the first SoC resource;

setting a wake-up time timer to expire at the wake-up time; and waking up the first SoC resource when the wake-up time timer expires when the first SoC resource is asleep, wherein waking up the first SoC resource comprises waking up at least one sub-resource in the first SoC resource; and putting the first SoC resource into a sleep state when the first SoC resource is in an idle state and a current wake-up time for which the wake-up time timer is set to expire comprises a greater time duration from a current time than a resource break-even time, wherein the sleep state comprises a low power state for one or more sub-components in the first SoC resource, the time duration being less than a time to complete one hundred cycles, wherein the break-even time comprises an error guardband added to the time needed by the first SoC resource to be kept in a powered down state to cover a cost of powering the first SoC resource up.

2. The method of claim 1, wherein the break-even time comprises a time needed by the first SoC resource to be kept in a powered down state to cover a cost of powering the first SoC resource up.

3. The method of claim 1, further comprising putting the first SoC resource into a sleep state when the SoC resource is in an idle state when there is no wake-up time scheduled, wherein the sleep state comprises a lower power state for one or more sub-components in the first SoC resource.

4. The method of claim 1, further comprising:
maintaining a wake-up time queue comprising a plurality of wake-up times, wherein the wake-up time queue keeps track of future wake-up times the first SoC resource will need to wake-up; and
setting the wake-up time timer to expire for a one of the plurality of wake-up times that will arrive soonest.

5. The method of claim 1, further comprising:
determining a time period for a process to be completed by the first SoC resource;
determining a third SoC resource to which a second result message generated as a result of completion of the process will be sent;
determining a time to transmit the second result message to the third SoC resource from the first SoC resource; and
sending a second WNM to the third SoC resource, wherein the WNM comprises a second wake-up time, wherein the second wake-up time comprises a time at which the third SoC resource is expected to receive the second result message, and wherein the second wake-up time is determined according to the time period for the process to be completed by the first SoC resource and the time to transmit the second result message to the third SoC resource from the first SoC resource.

6. The method of claim 1, wherein determining the wake-up time according to the time at which the result message from the second SoC is expected to arrive at the first SoC resource comprises determining an amount of time necessary for the first SoC resource to power up and be ready to operate without a latency and setting the wake-up time to a time that is before the time at which the result message from the second SoC resource is expected to arrive at the first SoC resource by at least the amount of time necessary for the first SoC resource to power up and be ready to operate without a latency.

7. A system on a chip (SoC) resource, the SoC resource comprising:
an input/output (I/O) interface connected to an interconnect and configured to receive a wakeup notification message (WNM) from a second SoC resource via the interconnect, wherein the WNM comprises a time at which a result message from the second SoC resource is expected to arrive at the SoC resource, and wherein the second SoC resource sends the WNM at or before the start of a feeder operation in the second SoC resource; and
a power management controller coupled to the I/O interface and configured to determine a wake-up time according to the time at which the result message from the second SoC resource is expected to arrive at the SoC resource, set a wake-up time timer to expire at the wake-up time, and wake up at least one sub-component in the SoC resource when the wake-up time timer expires when the at least one sub-component in the SoC resource is in a sleep state, the power management controller further configured to put the SoC resource into a sleep state when the SoC resource is in an idle state and a current wake-up time for which the wake-up time timer is set to expire comprises a greater time duration from a current time than a resource break-even time, wherein the sleep state comprises a low power state for one or more sub-components in the SoC resource, and the time duration being less than a time to complete one hundred cycles, wherein the break-even time comprises an error guardband added to the time needed by the SoC resource to be kept in a powered down state to cover a cost of powering the SoC resource up.

8. The SoC resource of claim 7, wherein the break-even time comprises a time needed by the SoC resource to be kept in a powered down state to cover a cost of powering the SoC resource up.

9. The SoC resource of claim 7, wherein the power management controller is further configured to put the SoC resource into a sleep state when the SoC resource is in an idle state when there is no wake-up time scheduled, wherein the sleep state comprises a lower power state for one or more sub-components in the SoC resource.

10. The SoC resource of claim 7, wherein the power management controller is further configured to:
maintain a wake-up time queue comprising a plurality of wake-up times, wherein the wake-up time queue keeps track of future wake-up times the SoC resource will need to wake-up; and
set the wake-up time timer to expire for a one of the plurality of wake-up times that will arrive soonest.

11. The SoC resource of claim 7, wherein the power management controller is further configured to:
determine a time period for a process to be completed by the SoC resource;
determine a third SoC resource to which a second result message generated as a result of completion of the process will be sent;
determine a time to transmit the second result message to the third SoC resource from the SoC resource; and
cause the I/O interface to send a second WNM to the third SoC resource, wherein the WNM comprises a second wake-up time, wherein the second wake-up time comprises a time at which the third SoC resource is expected to receive the second result message, and wherein the second wake-up time is determined according to the time period for the process to be completed by the SoC resource and the time to transmit the second result message to the third SoC resource from the SoC resource.

12. The SoC resource of claim 7, wherein the power management controller is configured to determine an amount of time necessary for the SoC resource to power up and be ready to operate without a latency and configured to set the wake-up time to a time that is before the time at which the result message from the second SoC resource is expected to arrive at the SoC resource by at least the amount of time necessary for the SoC resource to power up and be ready to operate without a latency in order to determine the wake-up time according to the time at which the result message from the second SoC resource is expected to arrive at the SoC resource.

13. The SoC resource of claim 7, wherein the sleep state comprises one of three sleep modes, wherein the three sleep modes comprise a light sleep mode, a deep sleep mode, and a shut down mode, wherein the light sleep mode comprises a shortest wakeup time and a least power savings of the three sleep modes, wherein the shut down mode comprises a longest wakeup time and a maximum power savings of the three modes, and wherein the deep sleep mode provides a wakeup time and a power savings that are between those provided by the light sleep mode and the deep sleep mode.

14. A data processing system, comprising:
a plurality of system on a chip (SoC) resources configured for messaging based communication with each other; and
a network bus connected to each of the plurality of SoC resources,
wherein at least one of the SoC resources comprises:
an input/output (I/O) interface connected to the network bus;
at least one resource processing sub-component or resource storage sub-component connected to the I/O interface;
a power management controller connected to the I/O interface;
a power supply connected to the power management controller and connected to the at least one resource processing sub-component or resource storage sub-component connected to the I/O interface; and
a wake-up time timer connected to the power management controller,
wherein the I/O interface is configured to receive a wakeup notification message (WNM) from another one of the SoC resources, wherein the WNM comprises a time at which a result message from the another one of the SoC resources is expected to arrive at the at least one of the SoC resources, and wherein the second SoC resource sends the WNM at or before the start of a feeder operation in the second SoC resource, and
wherein the power management controller is configured to determine a wake-up time according to the time at which the result message from the another one of the SoC resources is expected to arrive at the at least one of the SoC resources, set the wake-up time timer to expire at the wake-up time, and wake up at least one sub-resource in at least one of the SoC resources when the wake-up time timer expires when at least one sub-resource in at least one of the SoC resources is asleep, the power management controller further configured to put the at least one of the SoC resources into a sleep state when the at least one of the SoC resources is in an idle state and a current wake-up time for which the wake-up time timer is set to expire comprises a greater time duration from a current time than a resource break-even time, wherein the sleep state comprises a low power state for the at least one resource processing sub-component or resource storage sub-component, the time duration being less than a time to complete one hundred cycles, and wherein the break-even time comprises an error guardband added to the time needed by the at least one of the SoC resources to be kept in a powered down state to cover a cost of powering the at least one of the SoC resources up.

15. The data processing system of claim 14, wherein the break-even time comprises a time needed by the at least one of the SoC resources to be kept in a powered down state to cover a cost of powering the at least one of the SoC resources up.

16. The data processing system of claim 14, wherein the power management controller is further configured to put the at least one of the SoC resources into a sleep state when the at least one of the SoC resources is in an idle state when there is no wake-up time scheduled, wherein the sleep state comprises a lower power state for the at least one resource processing sub-component or resource storage sub-component.

17. The data processing system of claim 14, wherein the power management controller is further configured to:
maintain a wake-up time queue comprising a plurality of wake-up times, wherein the wake-up time queue keeps track of future wake-up times at which the at least one of the SoC resources will need to wake-up; and
set the wake-up time timer to expire for a one of the plurality of wake-up times that will arrive soonest.

18. The data processing system of claim 14, wherein the power management controller is further configured to:
determine a time period for a process to be completed by the at least one of the SoC resources;
determine a second SoC resource from the SoC resources to which a second result message generated as a result of completion of the process will be sent;
determine a time to transmit the second result message to the second SoC resource from the at least one of the SoC resources; and
send a second WNM to the second SoC resource, wherein the second WNM comprises a second wake-up time, wherein the second wake-up time comprises a time at which the second SoC resource is expected to receive the second result message, and wherein the second wake-up time is determined according to the time period for the process to be completed by the at least one of the SoC resources and the time to transmit the second result message to the second SoC resource from the at least one of the SoC resources.

19. The data processing system of claim 14, wherein the power management controller is further configured to determine the wake-up time according to the time at which the result message from the other SoC resource is expected to arrive at the at least one of the SoC resources according to an amount of time necessary for the at least one of the SoC resources to power up and be ready to operate without a latency and to set the wake-up time to a time that is before the time at which the result message from the other SoC resource is expected to arrive at the at least one of the SoC resources by at least the amount of time necessary for the at least one of the SoC resources to power up and be ready to operate without a latency.

20. The data processing system of claim 14, wherein the network bus comprises one of a network on a chip (NoC) and a cross bar interconnect.

\* \* \* \* \*

UNITED STATES PATENT AND TRADEMARK OFFICE
CERTIFICATE OF CORRECTION

| | | |
|---|---|---|
| PATENT NO. | : 9,448,617 B2 | Page 1 of 1 |
| APPLICATION NO. | : 14/204555 | |
| DATED | : September 20, 2016 | |
| INVENTOR(S) | : Brown et al. | |

It is certified that error appears in the above-identified patent and that said Letters Patent is hereby corrected as shown below:

In the Claims

In Column 9, Line 4, Claim 1, delete "which-the" and insert --which the--.

Signed and Sealed this
Third Day of January, 2017

Michelle K. Lee
*Director of the United States Patent and Trademark Office*